June 15, 1965  E. A. BULLINGER  3,189,302
TORQUE-COMPENSATION APPARATUS FOR HELICOPTERS
Filed Sept. 23, 1963
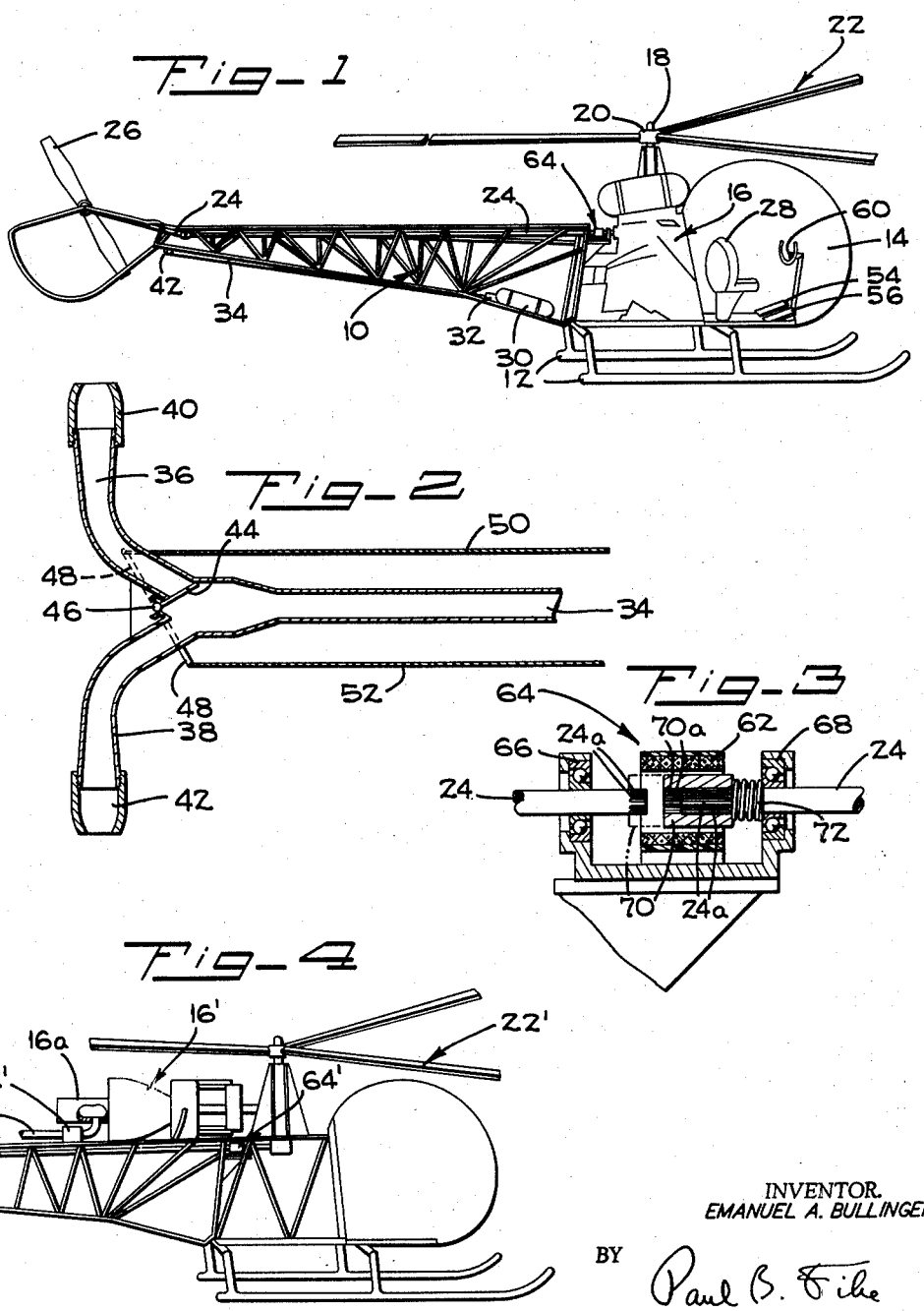
INVENTOR.
EMANUEL A. BULLINGER
BY Paul B. Fihe
PATENT AGENT

United States Patent Office 3,189,302
Patented June 15, 1965

3,189,302
TORQUE-COMPENSATION APPARATUS
FOR HELICOPTERS
Emanuel A. Bullinger, P.O. Box 352, Etna, Calif.
Filed Sept. 23, 1963, Ser. No. 310,753
4 Claims. (Cl. 244—17.21)

The present invention relates generally to helicopters and more particularly to improvements in helicopter torque-compensation apparatus constituting a necessary adjunct of successful flight.

It is well known that the rotary wing-supporting structure of a helicopter produces a rotational force or torque which is conventionally compensated for by an auxiliary propeller or tail rotor mounted at the extremity of the aircraft fuselage and arranged for drive connection to the aircraft engine in a predetermined fashion requisite to compensation for the torque produced by rotation of the supporting wing structure. Destruction of such tail rotor or the drive connection thereto has been observed to produce disastrous results.

Accordingly, it is a general object of the present invention to provide an auxiliary torque-compensation apparatus which can be substantially instantaneously energized in the event of operational failure of the conventional tail rotor.

It is a feature of the invention to provide a torque-compensation apparatus which utilizes an appropriately directed and contolled fluid jet to provide the requisite force.

More particularly, it is a feature of the invention to provide a torque-compensation apparatus which includes a bifurcated fluid jet exhaust conduit together with operator-controlled means for determining the amount of fluid flow through the respective sections of such bifurcated conduit to thereby provide precise control of the compensating torque.

In accordance with one aspect of the invention, it is a feature to provide a torque-compensation apparatus which utilizes a source of fluid that is completely independent of operation of the main helicopter engine.

Alternatively, it is a feature of the invention to utilize a source of jet fluid which constitutes a by-product of the fluid exhaust from a helicopter engine of the turbine variety.

Yet another feature of the invention is to provide operator controlled means for substantially instantaneously energizing the jet torque-compensation apparatus.

A correlated feature of the invention is the provision of means for decoupling or disconnecting the tail rotor of the helicopter from the helicopter engine simultaneously with energization of the jet torque-control apparatus.

More specifically, it is a feature of the invention to provide a quick-disconnect arrangement of the tail rotor of a helicopter which constitutes a magnetically actuated clutch of novel configuration.

These as well as other objects and features of the invention will become more apparent from a perusal of the following description of the structures illustrated in the accompanying drawing wherein:

FIG. 1 is a perspective view of a helicopter incorporating a torque-compensation apparatus in accordance with one aspect of the present invention, FIG. 2 is an enlarged, fragmentary view of a portion of the torque-compensation apparatus embodied in the FIG. 1 helicopter, FIG. 3 is an enlarged, longitudinal, sectional view of a novel clutch mechanism also embodied in the FIG. 1 helicopter structure, and FIG. 4 is a fragmentary, side elevational view of a modified toque-compensation apparatus for a turbine-driven helicopter.

With initial reference to FIG. 1, the illustrated helicopter is generally of conventional structure including an elongated fuselage or frame 10 composed of a plurality of tubular struts carrying a landing gear 12 on its undersurface adjacent one end. The operator's cockpit 14 is mounted above the landing gear 12 at the forward end of the fuselage and immediately in advance of an internal combustion engine 16 whose vertically-extending drive shaft 18 mounts at its upper end a tiltable hub 20 which in turn carries three blades of the main rotary wing structure 22 of the aircraft.

A secondary shaft 24 is suitably coupled to the main drive shaft 18 and extends rearwardly along the entire length of the fuselage 10 for driving connection to a tail rotor 26 mounted on a substantially horizontal stub shaft at the rear extremity of the aircraft. To control the rotary wing 22 and the tail rotor 26, suitable control structures are mounted in the described cockpit 14 in front of the operator's seat 28. Since the structure as thus far described is conventional, no further details are explicated.

During conventional operation, the rotary wing structure 22 provides the lifting force for the helicopter and the tail rotor 26 is appropriately driven to compensate for the torque produced by such main rotary wing structure.

In accordance with the present invention, an alternative torque-compensation apparatus is added to the aircraft, as described. More particularly, a tank 30 containing compressed air or other gas is mounted upon the fuselage immediately rearwardly of the main engine 16 and is arranged to supply fluid delivered therefrom under the control of a solenoid valve 32 of conventional variety into and through a tubular conduit 34 which extends rearwardly along the fuselage of the aircraft to a point adjacent the tail portion or rear extremity thereof. At this position, the conduit 34 is bifurcated to form two sections 36, 38 which curve laterally outward in a substantially horizontal plane and terminate in laterally opposed exhaust nozzles 40, 42, as best shown in FIG. 2.

The amount of fluid moving into the opposed terminal sections 36, 38 of the conduit 34 is under the control of the aircraft operator through a mechanism which includes a vane 44 supported for pivotal motion about a substantially vertical axis at the position of the conduit bifurcation on a shaft 46 which mounts at its lower end a laterally projecting control lever 48 to the opposite extremities of which are connected control cables 50, 52 which in turn pass forwardly along the aircraft fuselage for connection to foot pedals 54, 56 within the operator's cockpit 14.

The size of the tank 30 containing compressed air or other fluid will be partially dependent upon the size of the aircraft as will be the dimensions of the main fluid conduit 34 and the bifurcated terminal sections 36, 38 thereof. Preferably, as illustrated the nozzles 40, 42 at the extremities of the terminal sections are suitably connected thereto as by threaded connections and dimensioned in accordance with the general torque requirements of the particular aircraft. Accordingly, a mere change in the dimensions of such nozzles 40, 42 will facilitate the application of the jet torque-compensation apparatus to helicopters of variant sizes.

The described jet torque-compensation apparatus is normally in an inoperative state but can be almost instantaneously energized by the simple opening of the solenoid valve 32 connected to the fluid tank 30 by throwing of a switch 60 within the cockpit 14. Preferably such switch actuation also simultaneously functions to energize another solenoid 62 which serves to decouple or disconnect the drive to the tail rotor 26, such solenoid 62 forming part of a magnetic clutch generally indicated at 64 in FIG. 1 and more fully illustrated in FIG. 3. As there illustrated, the magnetic clutch 64 includes spaced bearing structures 66, 68 which mount for rotation and in alignment the extremities of sections of the secondary shaft 24 which are connected when motion is to be imparted to the tail rotor 26 from the aircraft engine 16. The mentioned solenoid 62 constitutes a generally cylindrical structure which is mounted on the aircraft fuselage 10 to encompass the ends of the shaft sections as well as a connecting sleeve 70 which has a plurality of axially-extending slots 70a formed in its interior surface. The two shaft sections are both formed with corresponding slots 24a on their exterior surfaces wherefore the sleeve 70 is adapted to drivingly connect the two shaft sections when urged to the phantom-line disposition illustrated in FIG. 3 under the influence of a compressed coil spring 72. When the encompassing solenoid 62 is energized in the manner previously mentioned, the connecting sleeve 70 will be immediately withdrawn to the illustrated full-line disposition and drive to the tail rotor 26 will immediately cease.

Accordingly, it will be obvious that, if for example the tail rotor 26 is in some fashion broken, depression of a single switch 60 will decouple energization of the tail rotor and simultaneously open the solenoid valve 32 for the compressed air or other fluid so that the latter may flow through the conduit 34 and thence through the laterally-opposed terminal sections 36, 38 to immediately replace the torque-compensating effect of the now de-energized tail rotor 26. A relatively small supply of compressed air or other fluid medium will be sufficient to enable the helicopter operator to land safely and repair the rotor damage.

The invention can be embodied in modified arrangements, one of which is illustrated by way of example in FIG. 4 wherein the helicopter is substantially of the same form as illustrated in FIG. 1, but utilizes a turbine 16' as a prime mover, suitable connections being made therefrom to the main rotary wing 22' and the tail rotor through a magnetic clutch 64' structure of the type shown in FIGS. 1 and 3. Details of the turbine 16' are not shown since any commercial turbine such as the "Turbo Meca" or one of those manufactured by General Electric, Allis-Chalmers, or Lycoming can be used. A lateral conduit 34' is connected to the tail pipe section 16a of the turbine 16' so that a portion of its exhaust may be delivered through such conduit 34' under the control of a solenoid valve 32' corresponding to that illustrated in FIG. 1. Such conduit 34' follows the fuselage of the aircraft rearwardly and corresponds generally to the conduit 34 in the first illustrated embodiment of the invention terminating in bifurcated sections and incorporating a similar control vane arrangement (not shown).

The operation is substantially the same as that of the first embodiment of the invention. If the tail rotor is damaged, its drive connection is disconnected through the magntic clutch 64' and the solenoid valve 32' is substantially simultaneously opened to provide for fluid flow through the conduit 34' to thus provide the requisite torque-compensating effect.

Various other modifications and/or alterations can obviously be made in the described structures without departing from the spirit of the invention, and the foregoing description is accordingly to be considered only for exemplary purposes and not in a limiting sense. The actual scope of the invention is to be indicated rather by reference to the appended claims.

What is claimed is:

1. Torque-compensation apparatus for a helicopter having an engine and a main rotary wing and a tail rotor drivingly connected thereto which apparatus comprises fluid delivery means terminating laterally in the tail portion of the helicopter to provide a torque arranged to compensate for the torque generated by rotation of the main rotary wing, normally-closed clutch means in the drive connection between the engine and the tail rotor for controlling operation of the tail rotor only, and means for simultaneously opening said clutch to deenergize the tail rotor and for energizing said fluid delivery means.

2. Torque-compensation apparatus according to claim 1 wherein said clutch-opening means and said fluid-delivery energizing means include a pair of simultaneously energized solenoids.

3. Torque-compensation apparatus for a helicopter having an engine and a main rotary wing and a tail rotor drivingly connected thereto which comprises a supply of pressurized fluid, conduit means connected to said supply of fluid and having an open end laterally adjacent the tail rotor, a solenoid valve in said conduit for controlling flow of fluid therethrough and the amount of lateral thrust from said conduit, a solenoid-controlled clutch for the drive connection between the engine and the tail rotor for controlling operation of the tail rotor only, and means for energizing said solenoids to open the valve and disconnect said clutch.

4. Torque-compensation apparatus according to claim 3 wherein said clutch includes a splined sleeve mounted for axial motion under the influence of said solenoid.

References Cited by the Examiner

UNITED STATES PATENTS

| | | | |
|---|---|---|---|
| 947,962 | 2/10 | Butler | 192—67 |
| 2,383,038 | 8/45 | Bossi | 244—17.19 |
| 2,419,604 | 4/47 | Stanley | 244—17.19 |
| 2,486,272 | 10/49 | Gazda | 244—17.19 |
| 2,729,318 | 1/56 | Harter | 192—84 |
| 2,821,277 | 1/58 | Hughes | 192—67 |
| 2,861,664 | 11/58 | Simon et al. | 192—84 |
| 3,008,672 | 11/61 | Moore et al. | 244—52 X |
| 3,047,254 | 7/62 | Spearman et al. | 244—17.19 X |
| 3,049,321 | 8/62 | Nichols | 244—17.19 |
| 3,084,776 | 4/63 | Rabinow | 192—67 X |

FOREIGN PATENTS

| | | |
|---|---|---|
| 427,728 | 11/47 | Italy. |
| 770,026 | 3/57 | Great Britain. |
| 85,637 | 5/55 | Norway. |

FERGUS S. MIDDLETON, *Primary Examiner.*